US 6,614,971 B2

(12) United States Patent
Sun et al.

(10) Patent No.: US 6,614,971 B2
(45) Date of Patent: Sep. 2, 2003

(54) FANOUT SYSTEM OR APPARATUS FOR A FIBER OPTIC CABLE AND INCLUDING A METHOD OF FABRICATING SAME

(75) Inventors: Maurice X. Sun, Westmont, IL (US); Igor Grois, Northbrook, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/004,692

(22) Filed: Dec. 4, 2001

(65) Prior Publication Data
US 2003/0103743 A1 Jun. 5, 2003

(51) Int. Cl.⁷ .................................................. G02B 6/44
(52) U.S. Cl. ...................................................... 385/114
(58) Field of Search ................................ 385/100, 114, 385/115, 116

(56) References Cited

U.S. PATENT DOCUMENTS 5,187,765 A * 2/1993 Muehlemann et al. ...... 385/115
5,838,861 A * 11/1998 Bunde ......................... 385/100
5,911,024 A * 6/1999 Wallace ....................... 385/120
6,078,714 A * 6/2000 Cavanaugh .................. 385/115
6,295,400 B1 * 9/2001 Shahid ......................... 385/114
6,438,301 B1 * 8/2002 Johnson et al. ............. 385/101

* cited by examiner

Primary Examiner—Neil Abrams
Assistant Examiner—Thanh-Tam Le
(74) Attorney, Agent, or Firm—A. A. Tirva; Romi N. Bose

(57) ABSTRACT

A fanout system is provided for a fiber optic cable which includes a plurality of optical fibers. A fiber optic ribbon includes a plurality of individual optical fibers adhered to a flat substrate in a generally parallel side-by-side array. The fibers are spread apart in a fanned-out array at an edge of the substrate. Loose ends of the fibers extend beyond the edge of the substrate. A plurality of tube members individually surround the loose ends of the fibers beyond the edge of the substrate. A protective transition member collectively surrounds the loose ends of the fibers at least in an area extending from the edge of the substrate to proximal ends of the tube members.

21 Claims, 4 Drawing Sheets

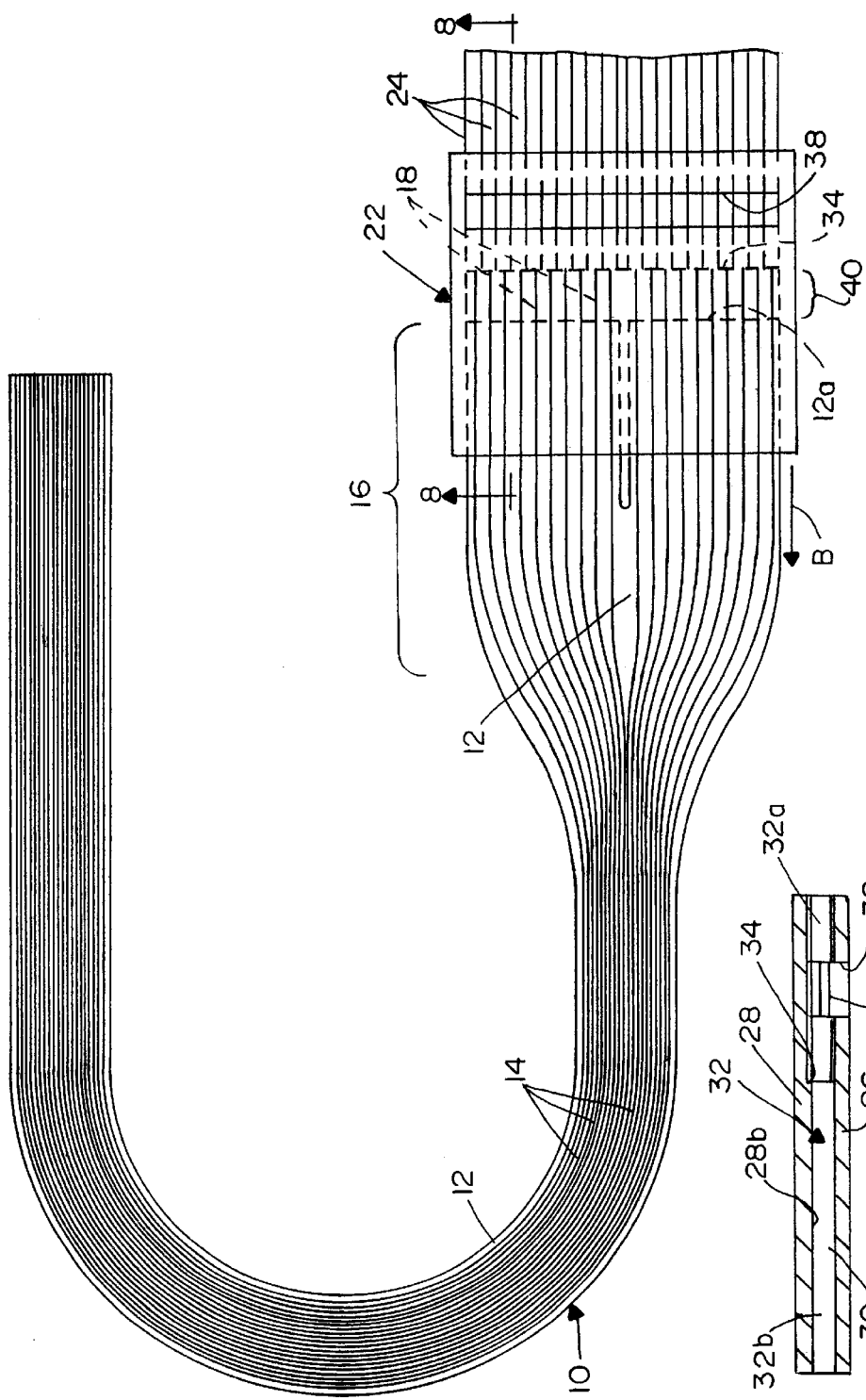

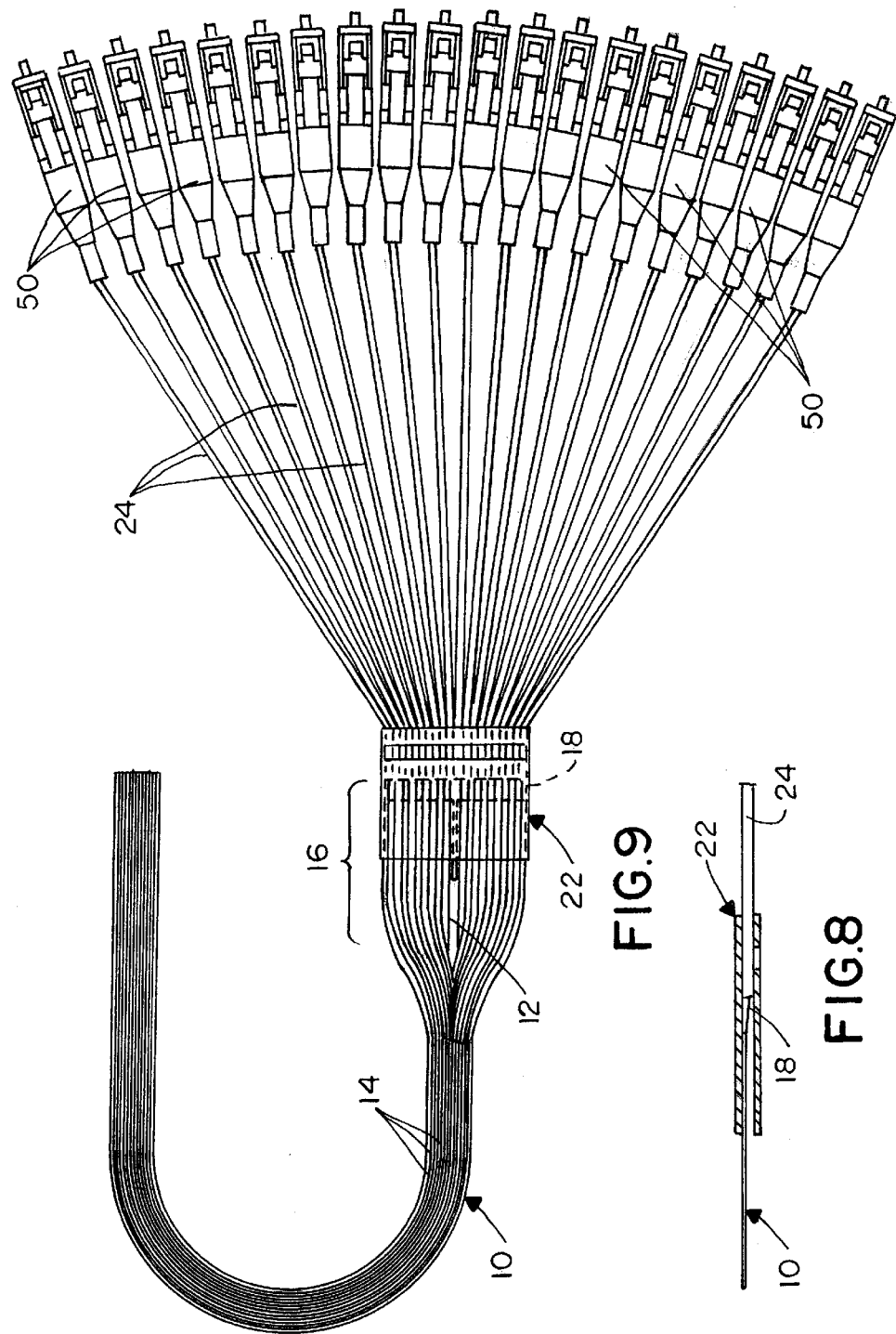

FANOUT SYSTEM OR APPARATUS FOR A FIBER OPTIC CABLE AND INCLUDING A METHOD OF FABRICATING SAME

FIELD OF THE INVENTION

This invention generally relates to the art of fiber optic apparatus and, particularly, to a fanout system or apparatus for a plurality of optical fibers of a fiber optic cable, along with a method of fabricating the apparatus.

BACKGROUND OF THE INVENTION

Fiber optic connectors of a wide variety of designs have been employed to terminate optical fiber cables and to facilitate connection of the cables to other cables or other optical fiber transition devices. A typical fiber optic connector includes a ferrule which mounts and centers an optical fiber or fibers within the connector. The ferrule may be fabricated of such material as ceramics. A multi-fiber optic cable may be terminated in a single connector, or the plurality of individual optical fibers of the cable may be terminated in a plurality of connectors to form a fiber optic connector harness. A popular type of fiber optic cable is a multi-fiber flat cable which conventionally is called a fiber optic ribbon or a ribbon cable.

One of the problems in terminating the individual optical fibers of a fiber optic cable is that the fibers are maintained in the cable in a generally parallel, closely spaced side-by-side array. It is very difficult to manipulate these tiny fibers and properly organize the fibers for termination in one or more fiber optic connectors. This is particularly true of a fiber optic ribbon cable. Consequently, "fanout" connectors or other apparatus have been used with multi-fiber optic cables, particularly ribbon-type cables.

A fanout connector or apparatus includes a fanout means such as a fanout insert for receiving and spreading the individual fibers of the cable transversely thereof so that the fibers are more easily connectorized according to hardware interface requirements. The individual fibers extend away from the fanout insert and are spaced apart considerably relative to their closely-spaced relationship in the cable, itself. A plurality of easily manipulatable tubes may be positioned around the individual fibers to protect the fibers. The tubes may be color-coded to facilitate organizing and properly terminating the fibers. The present invention is directed to providing various improvements in fanout apparatus for such fiber optic cables, particularly for use with a fiber optic ribbon. The invention completely eliminates prior usage of separate fiber spreading mechanisms or inserts.

SUMMARY OF THE INVENTION

An object, therefore, of the invention is to provide a new and improved fanout system for a fiber optic cable which includes a plurality of optical fibers.

Another object of the invention is to provide a unique optical fiber fanout apparatus comprised of a fiber optic ribbon cable, itself.

A further object of the invention is to provide a new and improved method of fabricating an optical fiber fanout apparatus.

In the exemplary embodiment of the invention, a fanout system is provided for a fiber optic cable including a plurality of optical fibers. The system includes a fiber optic ribbon having a plurality of individual optical fibers adhered to a flat substrate in a generally parallel side-by-side array. The fibers are spread apart in a fanned-out array at an edge of the substrate. The loose ends of the fibers extend beyond the edge of the substrate for manipulation and termination purposes. Therefore, the fiber optic ribbon, itself, forms a fanout apparatus which eliminates extraneous fanout mechanisms, inserts or the like.

According to one aspect of the invention, the fanout system also may include a plurality of tube members individually surrounding the loose ends of the fibers beyond the edge of the substrate. A protective transition member in the form of a flat shroud collectively surrounding the loose ends of the fibers at least in an area extending from the edge of the substrate to proximal ends of the tube members.

In the preferred embodiment, fixing means, such as an adhesive, is provided for rigidly securing the proximal ends of the tube members within the protective transition member. A window is provided in the transition member for insertion therethrough of the adhesive into the interior of the transition member. The substrate and the fibers adhered thereto are slidably disposed within the protective transition member. Stop means are provided in the transition member for engagement by the proximal ends of the tube members to define proper relative positions of the tube members. The transition member preferably is transparent so that the adhesive application as well as the positions of the tube members can be visualized from externally of the transition member. Finally, a plurality of individual fiber optic connectors may be terminated to the loose ends of the plurality of individual optical fibers at distal ends of the tube members to form a fiber optic connector harness.

According to another aspect of the invention, a method of fabricating the fanout apparatus is contemplated. The method includes the fabrication of the fiber optic ribbon with its built-in fanout system. The method may include the assembly of the tube members as well as the protective transition member. The method also may include terminating the loose fibers to a plurality of connectors to form a fiber optic connector harness.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 6 is a section taken generally along line 6—6 of FIG. 3;

FIG. 7 is a plan view of the system of FIG. 2 in fully assembled condition;

FIG. 8 is a section taken generally along line 8—8 of FIG. 7; and

FIG. 9 is a plan view similar to that of FIG. 7, on a reduced scale and showing a plurality of fiber optic connectors terminated to the individual fibers of the ribbon cable.

DETAILED DESCRIPTION OF THE PREFERRED EMBODIMENT

Figure 1:
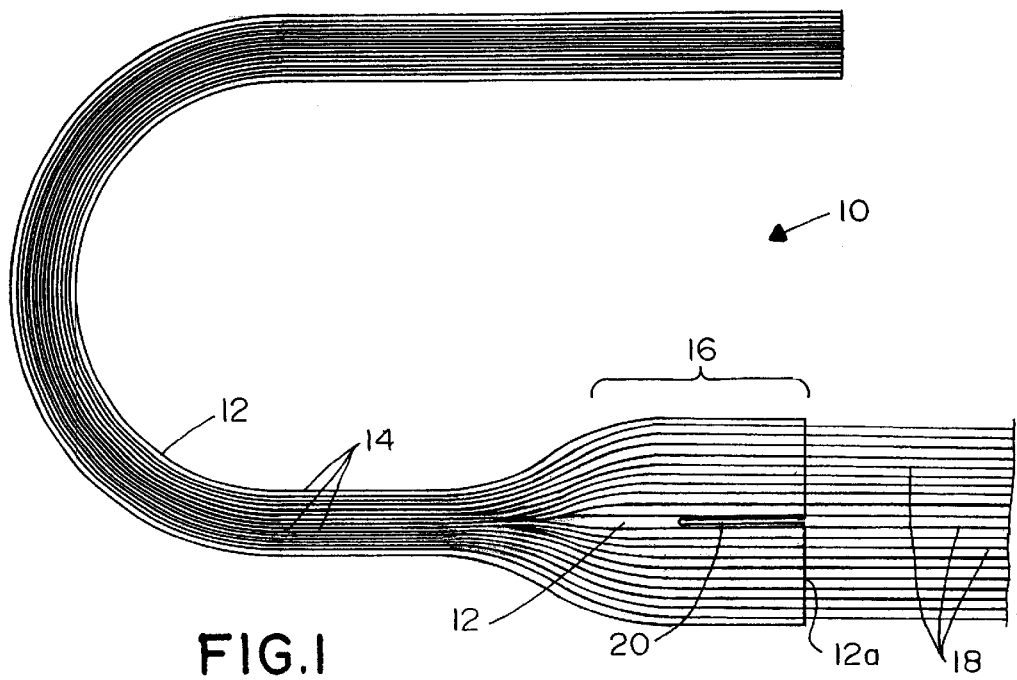
FIG. 1 is a plan view of a fiber optic ribbon cable incorporating the unique fanout apparatus of the invention.

Referring to the drawings in greater detail, the invention herein contemplates a unique fanout apparatus which is built directly into a fiber optic ribbon cable or "ribbon", as well as a new and improved fanout system which includes the fiber optic ribbon, as well as a method of fabricating the system or apparatus. In other words, the unique fiber optic ribbon of the invention has applications other than in the specific system shown herein.

With that understanding, FIG. 1 shows a fiber optic ribbon cable or "ribbon", generally designated 10, which includes a flat substrate 12 having a peripheral edge 12a at one end thereof. The substrate is flexible and is fabricated with an adhesive layer on one side thereof for adhering thereto of a plurality of individual optical fibers 14 in a generally parallel, very closely spaced side-by-side array. Typically, a conformal coating is applied over the fibers and the substrate after the fibers are routed onto and adhered to the substrate. The fibers are spread apart into a fanned-out array in a fanout area indicated at 16, generally at edge 12a of the substrate. Loose ends 18 of the fibers extend beyond edge 12a of the substrate as seen in FIG. 1. Finally, a slot 20 is formed in substrate 12 and extends a given distance inwardly from edge 12a into fanout area 16 for purposes described hereinafter. Although any number of individual optic fibers 14 and fiber ends 18 may be employed in ribbon 10, the illustrated embodiment shows ten fibers and fiber ends on each opposite side of slot 20.

Figure 2:
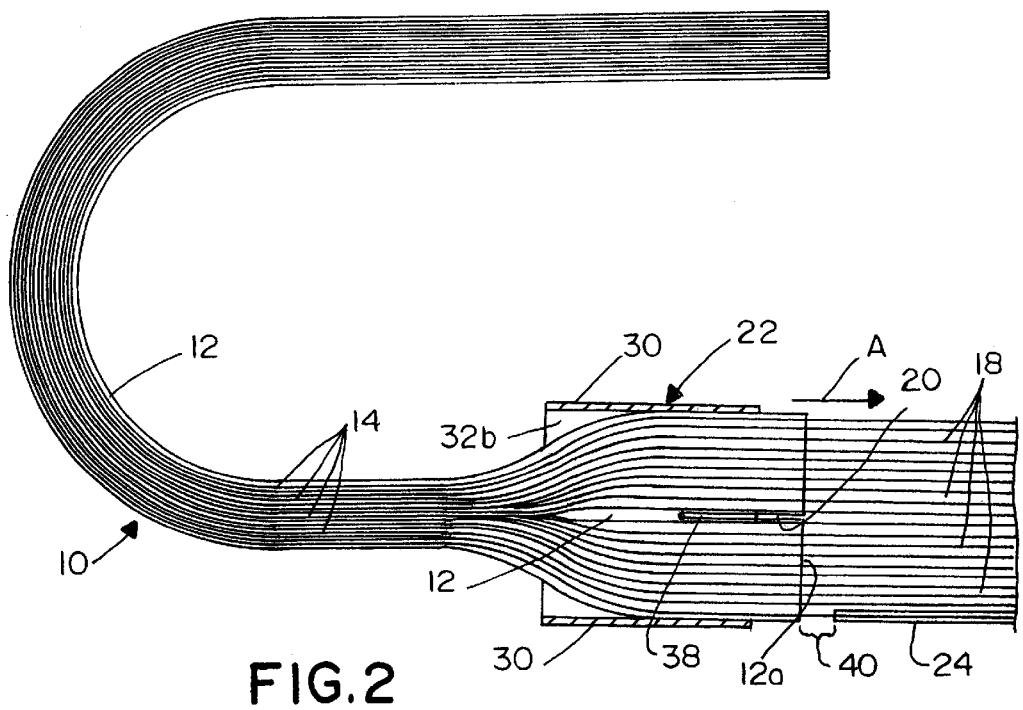
FIG. 2 is a plan view of the ribbon cable of FIG. 1 in conjunction with one of the tube members and the protective transition member of a fanout system.

FIG. 2 shows a protective transition member, generally designated 22, positioned over fanout area 16 (FIG. 1) of fiber optic ribbon 10. A flexible tube member 24 also is shown in FIG. 2 positioned over the loose end 18 of one of the individual optical fibers 14. As will be seen hereinafter, an individual tube member 24 is positioned over each loose end 18 of each optical fiber which extends beyond edge 12a of substrate 12 of the fiber optic ribbon.

Figure 5:
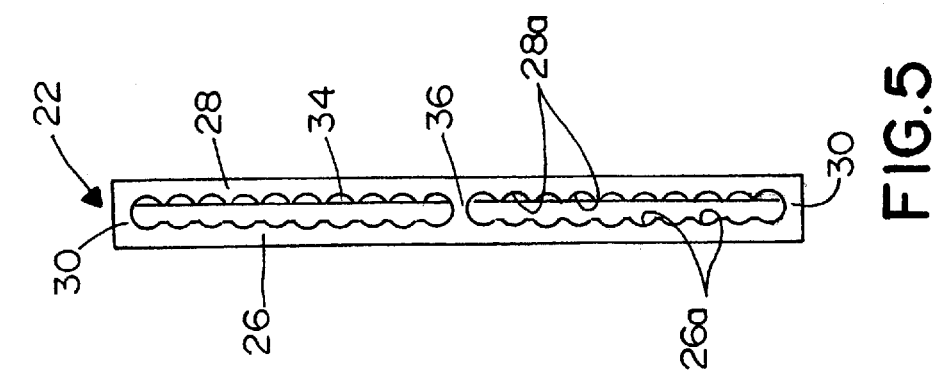
FIG. 5 is an end elevational view of looking at the right-hand end of the transition member in FIG. 3.
Figure 3:
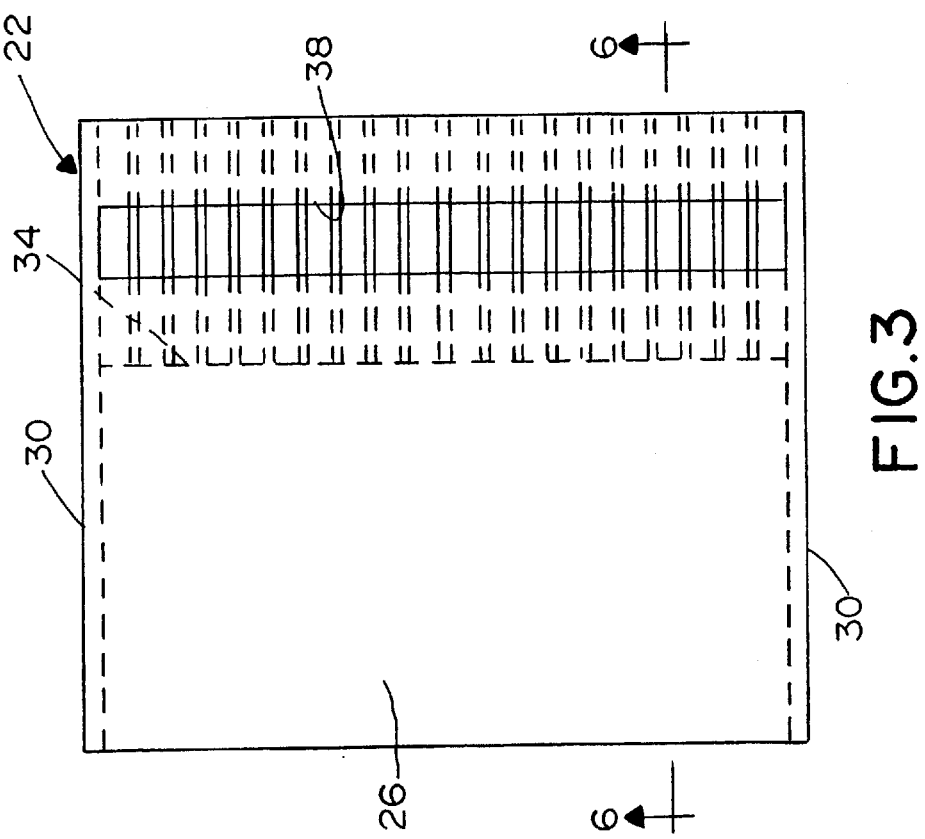
FIG. 3 is a top plan view of the protective transition member.
Figure 4:
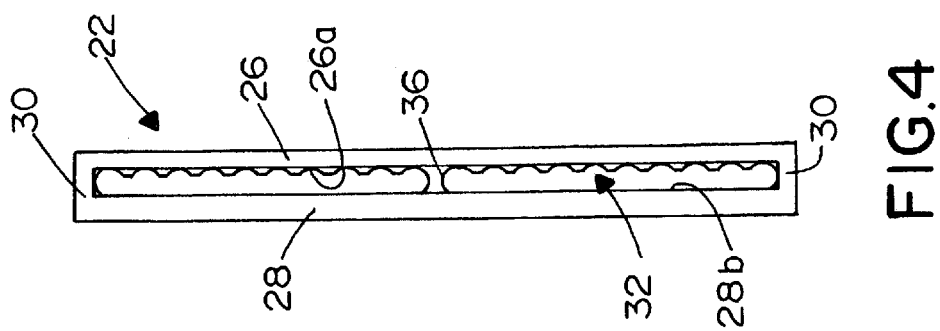
FIG. 4 is an end elevational view looking at the left-hand end of the transition member in FIG. 3.

Before proceeding further, reference is made to FIGS. 3–6 which show the details of protective transition member 22. As can be seen, the transition member is a generally flat hollow shroud defined by a top wall 26, a bottom wall 28 and a pair of side walls 30 joining the top and bottom walls to form a flat interior cavity, generally designated 32 in FIG. 4, for receiving fanout area 16 (FIG. 1) of fiber optic ribbon 10. The transition member preferably is fabricated of transparent plastic material to afford visualization of the interior thereof. As best seen in FIG. 6, interior cavity 32 (FIG. 4) generally is divided into a front interior cavity portion 32a and a rear interior cavity portion 32b. As best seen in FIG. 5, a plurality of troughs 26a are formed on the inside of top wall 26 and are aligned with a plurality of troughs 28a on the inside of bottom wall 28. These troughs combine to provide guide means for the insertion thereinto of a plurality of tubes 24. As best seen in FIG. 4, rear interior cavity portion 32b has a flat surface 28b of bottom wall 28 for guiding fanout area 16 of fiber optic ribbon 10 thereinto. As best seen in FIG. 6, a stop shoulder means 34 is defined between front interior cavity portion 32a and rear interior cavity portion 32b facing toward the front interior cavity portion. A stop 36 spans interior cavity 32 intermediate opposite ends of front interior cavity portion 32a for purposes described hereinafter. Finally, a window 38 in top wall 26 spans the entire width of transition member 22 as seen best in FIG. 3.

With the above description of protective transition member 22 in FIGS. 3–6, reference is now made back to FIG. 2 to describe the initial steps in fabricating the fanout system of the invention. In particular, loose fibers 18 and fanout area 16 (FIG. 1) of fiber optic ribbon 10 are inserted into rear interior cavity portion 32b of transition member 22 and are pulled forwardly in the direction of arrow "A" until stop 38 (FIGS. 4–6) of transition member 22 engages the bottom of slot 20 in the fiber optic ribbon. It can be seen that edge 12a of substrate 12 of the ribbon has been pulled forwardly beyond the transition member. Although only one tube 24 is shown in FIG. 2, a plurality of tube members 24 are individually positioned over loose ends 18 of fibers 14 to surround the loose ends of the fibers. The fibers can be adhesively fixed in the tube members. It can be seen that the tube members still leave sections 40 of the fibers uncovered.

FIG. 7 shows fanout area 16 of fiber optic ribbon 10 having been moved back in the direction of arrow "B" within protective transition member 22 and with tube members 24 having been moved into the front interior cavity portion of the transition member until the proximal ends of the tube members abut against stop shoulder means 34 inside the transition member.

The next step in the fabrication method of the invention is to rigidly secure the proximal ends of tube members 24 within protective transition member 22. Still referring to FIG. 7, a liquid adhesive is inserted through window 38 of transition member 22 into engagement with and about tube members 24 within the transition member. Upon curing, the adhesive forms a fixing means for rigidly securing the proximal ends of the tube members within the protective transition member. However, it should be noted that fanout area 16 of fiber optic ribbon 10, along with free sections 40 of loose ends 18 of the optical fibers remain slidably loose within the transition member. This allows for relative movement between the fibers and the tube members to compensate for different thermal expansion rates between the tubes and the individual optical fibers. For instance, the tubes may be fabricated of plastic material which thermally expands greater than the glass fibers. This relative movement between the fibers and the tubes can occur in high heat environments.

Lastly, FIG. 9 shows a plurality of individual fiber optic connectors, generally designated 50, terminated and fixed to the loose ends of the individual optical fibers at distal ends of tube members 24. The details of the individual fiber optic connectors are not described herein, because the connectors can take a wide variety of designs or configurations. Suffice it to say, the combination of the fiber optic connectors and the fanout system of the invention provides a unique fiber optic connector harness.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A fanout system for a fiber optic cable which includes a plurality of optical fibers, comprising:

a fiber optic ribbon including a plurality of individual optical fibers adhered to a flat substrate in a generally parallel side-by-side array, the fibers being spread apart on the flat substrate in a fanned-out array at an edge of the substrate, with loose ends of the fibers extending beyond the edge of the substrate; and a protective transition member collectively surrounding the loose ends of the fibers at least in an area extending from the edge of the substrate to proximal ends of the tube members.

2. The fanout system of claim 1, including fixing means for rigidly securing the proximal ends of said tube members within the protective transition member.

3. The fanout system of claim 2 wherein said fixing means comprises an adhesive rigidly securing the proximal ends of the tube members within the protective transition member.

4. The fanout system of claim 3 wherein said protective transition member includes a window for insertion therethrough of the adhesive into the interior of the transition member.

5. The fanout system of claim 1 wherein said protective transition member is transparent.

6. The fanout system of claim 1 wherein said substrate and the fibers adhered thereto are slidably disposed within the protective transition member.

7. The fanout system of claim 1, including stop means in the protective transition member for engagement by the proximal ends of said tube members to define proper positions of the tube members within the transition member.

8. The fanout system of claim 1 wherein said protective transition member comprises a flat shroud surrounding the loose ends of the fibers in a ribbon array.

9. The fanout system of claim 1, including a plurality of individual fiber optic connectors terminated to the loose ends of said plurality of individual optical fibers at distal ends of the tube members.

10. A fanout system for a fiber optic cable which includes a plurality of optical fibers, comprising:

a fiber optic ribbon including a plurality of individual optical fibers adhered to a flat substrate in a generally parallel side-by-side array, the fibers being spread apart on the flat substrate in a fanned-out array at an edge of the substrate, with loose ends of the fibers extending beyond the edge of the substrate;

a plurality of tube members individually surrounding the loose ends of the fibers beyond the edge of the substrate;

a protective transition member in the form of a flat shroud collectively surrounding the loose ends of the fibers in a ribbon array extending from the edge of the substrate to proximal ends of the tube members;

fixing means rigidly securing the proximal ends of said tube members within the protective transition member; and said substrate and the fibers adhered thereto being slidably disposed within the protective transition member.

11. The fanout system of claim 10 wherein said fixing means comprises an adhesive rigidly securing the proximal ends of the tube members within the shroud.

12. The fanout system of claim 11 wherein said shroud includes a window for insertion therethrough of the adhesive into the interior of the shroud.

13. The fanout system of claim 10 wherein said shroud is transparent.

14. The fanout system of claim 10, including stop means in the shroud for engagement by the proximal ends of said tube members to define proper positions of the tube members within the shroud.

15. The fanout system of claim 10, including a plurality of individual fiber optic connectors terminated to the loose ends of said plurality of individual optical fibers at distal ends of the tube members.

16. A method of fabricating a fanout assembly for a fiber optic cable which includes a plurality of optical fibers, comprising:

providing a fiber optic ribbon with a plurality of individual optical fibers adhered to a flat substrate in a generally parallel side-by-side array, the fibers being spread apart on the flat substrate in a fanned-out array at an edge of the substrate, with loose ends of the fibers extending beyond the edge of the substrate;

positioning a plurality of tube members individually around the loose ends of the fibers beyond the edge of the substrate; and installing a protective transition member collectively around the loose ends of the fibers at least in an area extending from the edge of the substrate to proximal ends of the tube members.

17. The method of claim 16, including the step of rigidly securing the proximal ends of the tube members within the protective transition member.

18. The method of claim 17 wherein the proximal ends of the tube members are rigidly secured within the protective transition member by the use of an adhesive.

19. The method of claim 18 including providing the protective transition member with a window for insertion therethrough of the adhesive into the interior of the transition member.

20. The method of claim 16 wherein said protective transition member is installed about the loose ends of the fibers so that the transition member is slidable relative to the fibers.

21. The method of claim 16, including the step of terminating a plurality of individual fiber optic connectors to the loose ends of the plurality of individual optical fibers at distal ends of the tube members.

\* \* \* \* \*